United States Patent [19]

Hettinga

[11] Patent Number: 4,613,475
[45] Date of Patent: Sep. 23, 1986

[54] CLAMPING STRUCTURE AND METHOD FOR CLAMPING THE MOLD UNIT OF A MOLD INJECTION APPARATUS

[76] Inventor: Siebolt Hettinga, 2123 NW. 111th St., Des Moines, Iowa 50322

[21] Appl. No.: 702,880

[22] Filed: Feb. 19, 1985

[51] Int. Cl.$^4$ .................... B29C 45/06; B29C 45/77
[52] U.S. Cl. ...................... 264/328.1; 264/328.8; 264/328.11; 425/574; 425/576; 425/589; 425/451.9
[58] Field of Search ............ 264/328.1, 328.8, 328.9, 264/328.11; 425/574, 575, 576, 581, 588, 589, 450.1, 451.9

[56] References Cited

U.S. PATENT DOCUMENTS 3,986,805 10/1976 Haines .............................. 425/451.9
4,238,181 12/1980 Dannels et al. ..................... 425/575

Primary Examiner—Jay H. Woo
Assistant Examiner—Timothy W. Heitbrink
Attorney, Agent, or Firm—Rudolph L. Lowell

[57] ABSTRACT

A method and apparatus for reducing the ram pressure normally required to seal the mold of an injection mold apparatus. A movable mold section is rigidly secured to a flat plate-like carriage member mounted for reciprocal movement relative to a stationary mold section. A plate unit is supported between the carriage member and the ram in a floating and axially aligned relation, with the movable mold section located within the perimetric confines of the carriage member and the plate unit. On linear extension of the ram to initially abutingly engage the plate unit and carriage member the movable mold section is moved into engagement with the stationary mold section whereby the ram clamping force is distributed uniformly in a pyramidal pattern from the ram to the perimetric portions of the mold sections to seal the mold.

5 Claims, 7 Drawing Figures

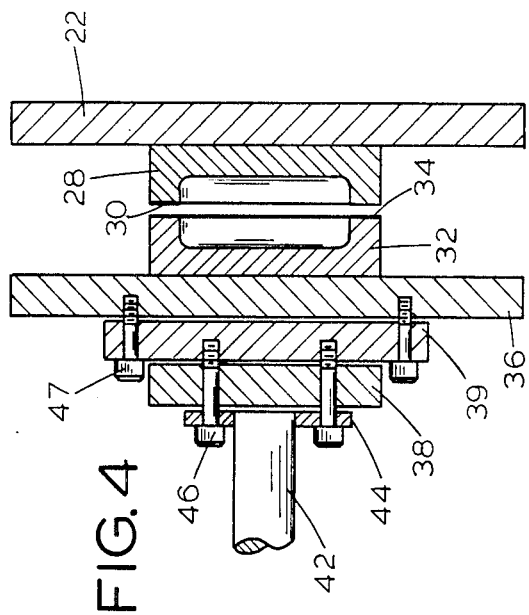
FIG. 3
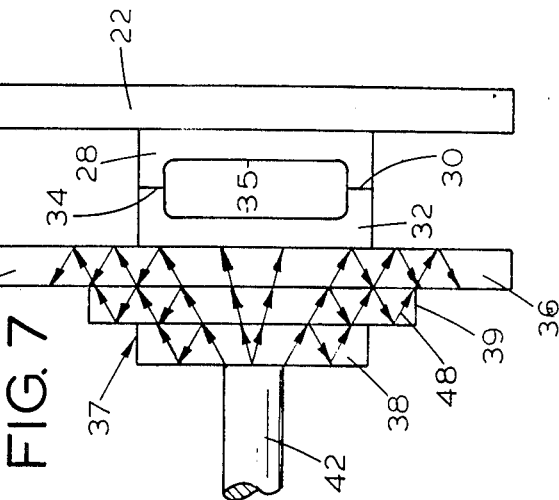
FIG. 4
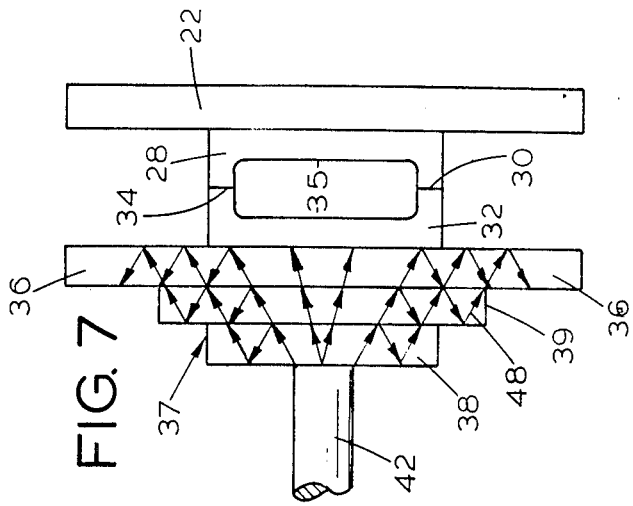
FIG. 7
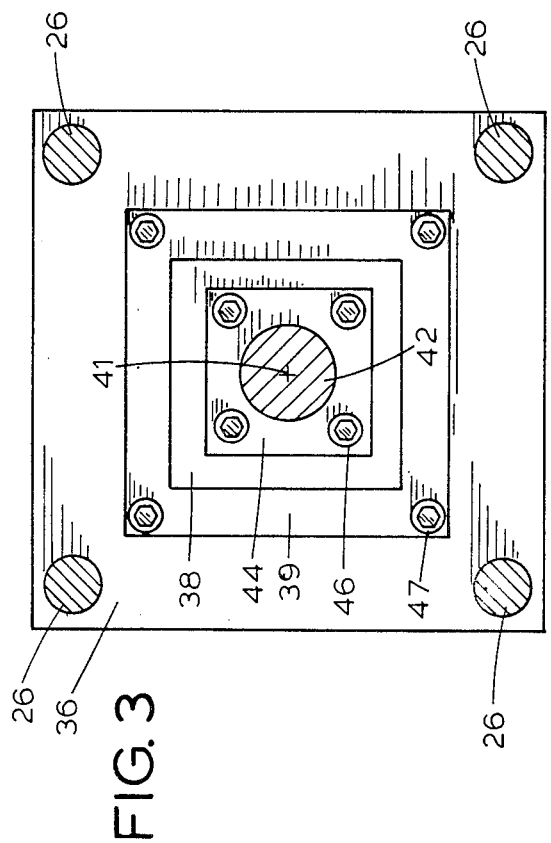
FIG. 5
FIG. 6

CLAMPING STRUCTURE AND METHOD FOR CLAMPING THE MOLD UNIT OF A MOLD INJECTION APPARATUS

BACKGROUND OF THE INVENTION

This invention relates to a clamping structure and the method for clamping together the mold sections of a mold unit to form a sealed mold cavity and, more particularly, to a clamping structure and method for transmitting or distributing the mold clamping force uniformly over the coacting cavity sealing portions of the mold sections.

Injection molding machines generally include a two-section mold unit wherein one of the mold sections is stationary and includes an ingate opening for the injection of mold material into the mold cavity. The other mold section is movable between an open position away from the stationary mold section and a closed position wherein the two mold sections are in sealed contact engagement to form the mold cavity. When mold material is injected under high pressure into the mold cavity, the two mold sections must be in a positive sealed engagement to prevent the escape of mold material from the mold cavity. Conventional injection molding machines typically apply a linearly directed hydraulic force only on the central portion of the movable mold section. This method of applying a mold clamping force generally results in a distortion of the movable mold section so as to require a relatively high pressure to seat only portions of the cavity seating surfaces of the mold sections.

SUMMARY OF THE INVENTION

The invention provides for an efficient and mechanically simple apparatus and method for distributing a single hydraulic force applied on the movable mold section uniformly over the coacting or mating opposed seating surfaces of the mold sections to seal all portions of the seating surfaces of the mold cavity with a relatively low clamping pressure. The movable mold section is rigidly mounted on a thick plate-like carriage member for reciprocal movement therewith toward and away from the stationary mold section to closed and open mold positions.

The clamping structure includes a plate assembly mounted in a lost motion relation with the carriage and having a plate. assembly with plate members arranged in a loosely stacked relation. The plate members, upon closing of the mold, are movable into successive abutting engagement with each other and the carriage. A hydraulic ram for applying the mold closing pressure on the movable mold section is connected through a lost motion connection with the plate assembly. The hydraulic ram, on being extended, initially moves the plate members of the plate assembly into abutting engagement, after which the plate assembly is moved as a unit into abutting engagement with the carriage member whereby to move the movable mold section into sealed engagement with the stationary mold section.

By virtue of the abutting engagement of the plate members, and in turn of the abutting engagement of the carriage member with the plate assembly, the centrally applied ram force is distributed in a pyramidal pattern from the hydraulic ram toward the peripheries of the plate assembly and carriage member. This pyramidal distribution of the ram applied force provides for the transmission of the centrally applied ram force through the plate assembly and carriage member for uniform application on the movable mold section and in turn over the peripheral seating surfaces of the two mold sections. This uniform distribution of the ram force substantially eliminates any distortion of the movable mold section and provides for the use of a reduced clamping force to seal the mold sections.

DESCRIPTION OF THE DRAWINGS

FIG. 3 is an enlarged sectional view taken along the line 3—3 of FIG. 2.

FIG. 4 is a diagrammatic showing of the space clearance between the plate members of the clamping plate assembly, the clamping ram and the carriage member for the movable mold section when the ram is being retracted;

FIG. 5 is a diagrammatic exaggerated showing of the distortion that generally occurs when a centrally directed force only is applied to the movable mold section by a conventional clamping structure;

FIG. 6 illustrates diagrammatically the non-uniform distribution of the clamping force when an integral clamping plate having a stepped peripheral surface is rigidly attached to the force applying ram; and FIG. 7 shows diagrammatically the uniform distribution over the mold sections of the clamping force by the use of the clamping structure of this invention.

DETAILED DESCRIPTION OF THE PREFERRED EMBODIMENT

Figure 1:
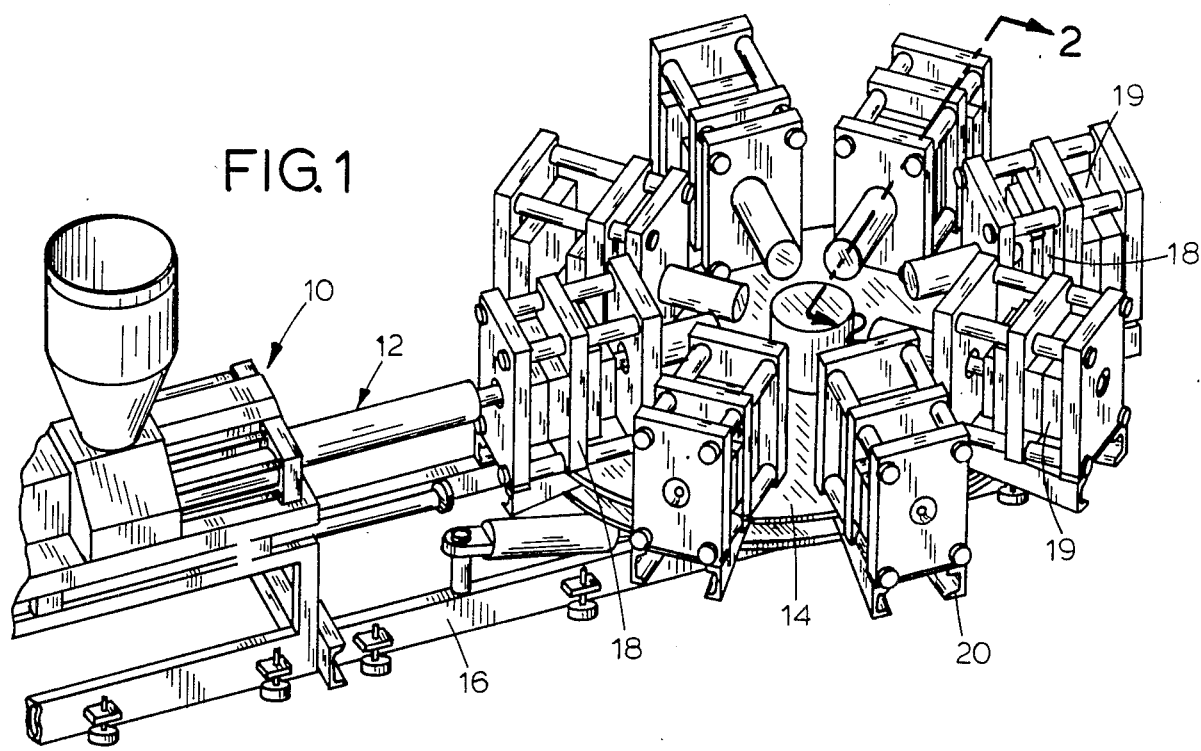
FIG. 1 is a perspective view of a mold injection apparatus showing the mold units thereof in assembly relation with the clamping structures of this invention.

In FIG. 1, there is illustrated a plastic injection molding apparatus 10 including an injection nozzle unit 12 and a turntable or carousel unit 14 mounted for rotation about a vertical axis on a main frame 16. Carousel 14 carries a plurality of circumferentially spaced clamping structures 18 having associated mold units 19 movable successively into an injection position relative to the injection nozzle unit 12.

Figure 2:
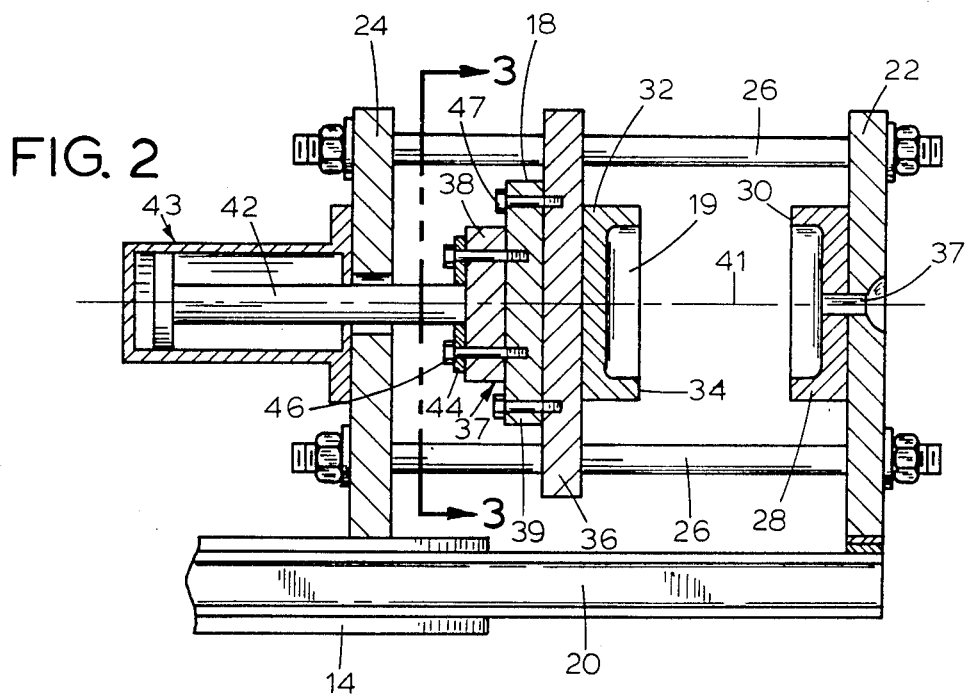
FIG. 2 is an enlarged sectional view of a mold unit and clamping structure assembly taken along the line 2—2 of FIG. 1.

A clamping structure 18 of the present invention is shown in FIG. 2 in the released position therefor relative to an associated mold unit. Corresponding to each assembly of a mold unit 19 and clamping structure 18 is a frame means 20 projected radially outwardly from the carousel unit 14. An upright support plate 22 for a stationary section 28 of the mold unit 19 is mounted adjacent the outer end of the frame means 20. An inner upright support plate 24 is mounted on the carousel unit 14 in a parallel relation with the outer support plate 22. Rigidly mounted on and extended between the support plates 22 and 24 are a plurality of slide rods 26, illustrated as four in number (FIG. 1), and arranged to define the corners of a rectangle. The stationary mold section 28 is mounted on the inner face of the outer support plate 22. A seating surface or seat 30 on the stationary mold section 28 is opposite from and faces a seating surface or seat 34 on a movable mold section 32 for sealing engagement therewith on closing of the mold unit 19 to form a mold cavity 35 (FIGS. 6 and 7). A gate opening 40 (FIG. 2) for the injection nozzle 12 is provided in the outer support plate 22 and stationary mold 28.

The movable mold section 32 is rigidly mounted on a carriage member 36 of a heavy flat plate construction slidably mounted on the slide bars 26 for reciprocal movement toward and away from the stationary mold section 28. The carriage member 36, and in turn the movable mold section 32, is moved toward and away from the stationary mold section 28 by the clamping structure 18, only one of which will be described in detail and with like numbers designating like parts. Each clamping structure 18 (FIG. 2) includes a plate assembly 37 illustrated as including a pair of plate members 38 and 39 arranged in a stacked relation with the carriage member 36 adjacent the side thereof opposite the movable mold section 32.

As shown (FIG. 3) the plate members 38 and 39 and the carriage member 36 are all of a generally rectangular shape, having a common axis 41 with the plate 38 being of a reduced area relative to the plate 39, and the area of the plate 39 being greater than the area of the movable mold section 32 so as to over lie the seating surface 34 of the movable mold section 32. A reciprocal movement of the carriage member 36 and plate assembly 37 on the slide rods 26 is provided by a ram or connecting rod 42 which forms part of a cylinder assembly 43 mounted on the inner face of the inner support plate 24 in coaxial alignment with the axis 41. The ram 42 is loosely extended through the inner support plate 24 (FIG. 2) for attachment in a lost motion connection with the plate member 38, which in turn is in a lost motion connection with the plate 39.

The free end of the ram 42 is equipped with a rectangular shaped flange 44. A plurality of bolts 46 extended through aligned openings in the flange 44 and plate 38 are threadably secured in the plate member 39 and of a length to permit relative movement of the plate 38 and flange 44 linearly of the axis 41 when in their secured positions. In a like manner, the plate 39 is attached in a lost motion connection with the carriage member 36 by bolts 47 extended laterally through the plate member 39 for threaded securement in the carriage member 36. On actuation of the hydraulic cylinder 43 to extend the ram, the flange 44, plate members 38 and 39 and carriage member 36 are successively moved into abutting engagement prior to any movement of the movable mold section 32 toward the stationary mold section 28. Likewise, on a retraction of the ram 42, the flange 44, plate members 38 and 39 and carriage member 36 are successively moved out of abutting engagement with each other prior to any movement of the movable mold section 32 away from the stationary mold section 28. This released position of the clamping structure 18 is illustrated in FIG. 4.

The ram 42, plate assembly 37 and carriage member 36 therefore, are in abutting engagement when the seating surfaces of the mold sections 28 and 32 are in engagement to form the sealed mold cavity 35. As a result, the force applied by the ram 42 against the inner plate member 38 is uniformly distributed in a pyramidal pattern from the ram 42 successively through the plate members 38, 39 and carriage member 36 for substantial uniform application over the movable mold section 32 and the seating surface thereof. This pattern of force distributed from the ram 42 to the movable section 32 is illustrated by the arrows 48 in FIG. 7. Since distortion of the movable mold section 32 is thus substantially eliminated, the seating surface 34 is maintained in full seating engagement with the seating surface 30 on the stationary mold section 28.

By comparison, when the ram 42 and the plate assembly 37 and carriage 36 are rigidly secured together as a unit, by welding or like means, the force applied by the ram 42 substantially along the axis 41 and against the central portion of the movable mold section 32 distorts the mold 32 as illustrated in dotted lines in FIG. 6. The ram force required centrally of the mold section 32 is thus of a magnitude that distorts such mold section while seating only partial portions of the surfaces 30 and 34 to seal the cavity 35. This distortion directly impairs the quality of the resultant mold.

As illustrated in FIG. 5, when the ram 42 is in rigid connection with the carriage member 36 only, the applied force is transmitted directly along the axis 41 resulting in a bowed distortion of the movable mold section 32. Since only a portion of the seating surface 34 of the mold section 32 is thus engageable in seating engagement with the surface 30 of the mold section 28, an excessive force by the ram 42 is required to avoid material leakage from the mold cavity 35. It has been found that use of the clamping structure 18 of this invention relative to a conventional mold clamping assembly of FIG. 5 reduced the clamping force required by the ram 42 by fifty to eighty percent.

To effect the stepped pyramidal pattern of force distribution the size of the plate members 38 and 39 is such that the area of the plate member 39 is only slightly larger than the corresponding area of the mold sections 28 and 32, with the smaller plate 38 being of a smaller size than the plate 39. Additionally, it was found that the transmission of the clamping force from the ram 42 through the plate assembly 37 and carriage member 36 was most efficient when the plate members 38 and 39 and the carriage member were composed of a high density closely grained metal to reduce the transmission loss of the ram force as it is distributed through the plate assembly and carriage member. It seems that the larger metal crystals of cast metal plates resulted in higher transmission losses and a reduction in the ability of the plates 38 and 39 to relatively float or shift during the distribution of the centrally applied force by the ram 42.

Although the invention has been described with respect to a preferred embodiment thereof, it is to be understood that it is not to be so limited since changes and modifications can be made therein which are within the full intended scope of this invention as defined by the appended claims.

I claim:

1. A method for uniformly distributing a clamping pressure to a mold comprised of a stationary mold section and a movable mold section to form a sealed mold cavity, wherein said mold sections have coacting perimetric seating portions defining said mold cavity, said movable mold section has a mold face side and an opposite flat side, and the mold clamping force is applied by a linearly extendible and retractable ram member against the central portion of the flat side of said movable mold section, comprising:

(a) providing a rigid carriage member having a flat side with a surface area greater than the area of the flat side surface of said movable mold section, (b) rigidly securing the flat side of the carriage member to the flat side of the movable mold section, (c) interposing a plate unit between the ram member and the carriage member and out of abutting engagement with each of said members when the ram member is retracted, and movable into abutting engagement with the ram member and the carriage member when the ram member is extended to engage the seating portions of said mold sections, and (d) positioning the plate unit with a flat side adjacent the carriage member having a surface area greater than the area of the flat side surface of the movable mold section, whereby the clamping force of the ram member is transmitted uniformly over the flat side surface of the carriage member for application against the flat side of the movable mold section when the ram member is extended to engage the seating portions of said mold sections.

2. The method according to claim 1, including:

(a) constructing the rigid carriage member and plate unit of a high density closely grained metal material.

3. A molding apparatus having a mold unit, said mold unit including a movable mold section and a stationary mold section, each mold section having a mold face side surface and an opposite flat side surface, each of said mold sections further having coacting perimetric seating portions, and a linearly extendible and retractable ram means for moving the movable mold section into and out of a clamped, seating engagement with the stationary mold section; a clamping structure comprising:

(a) a carriage member of a rigid plate form having a flat side with a surface area greater than the area of the flat side surface of said movable section, (b) means supporting the carriage member for reciprocal movement toward and away from the stationary mold section, (c) means rigidly securing the flat side of said movable mold section to said flat side of the carriage member, and within the surface area of said flat side, (d) a plate unit having a flat side with a surface area greater than the flat side surface area of said movable mold section, and less than the flat side surface area of said carriage member, and (e) means supporting the plate unit between and in a lost motion connection with the carriage member and the rams means when the ram means is in a retracted position therefor and said movable mold section being located within the surface area of said plate unit, whereby the mold clamping force of the ram means, on extension thereof to seat said mold sections, is uniformly distributed in a pyramidal pattern throughout said plate unit and carriage member for application against said movable mold section.

4. The molding apparatus according to claim 3, wherein:

(a) said plate unit includes a plurality of flat plate members arranged in a stacked relation with said carriage member, said plate members successively from the ram means having progressively enlarged surface areas and the flat side surface of the movable mold section is located within the confines of the flat side surface area of the plate member which is adjacent to the carriage member.

5. The molding apparatus according to claim 4, wherein:

(a) said plate unit and carriage member are constructed of a high density closely grained metal material.

* * * * *